US012640629B2

(12) United States Patent　　　　(10) Patent No.:　US 12,640,629 B2
Ogawa et al.　　　　　　　　　　　(45) Date of Patent:　　May 26, 2026

(54) METHOD FOR MANUFACTURING ROTOR, ROTOR, DRIVE APPARATUS, AND END PLATE

(71) Applicant: TOYOTA JIDOSHA KABUSHIKI KAISHA, Toyota (JP)

(72) Inventors: Noriko Ogawa, Miyoshi (JP); Hiroshi Kimpara, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 252 days.

(21) Appl. No.: 18/488,761

(22) Filed: Oct. 17, 2023

(65) Prior Publication Data

US 2024/0162793 A1　　May 16, 2024

(30) Foreign Application Priority Data

Nov. 14, 2022　　(JP) ................................. 2022-181611

(51) Int. Cl.
　　*H02K 1/28*　　　(2006.01)
　　*H02K 1/276*　　(2022.01)
　　*H02K 15/03*　　(2006.01)
(52) U.S. Cl.
　　CPC ............. *H02K 15/03* (2013.01); *H02K 1/276* (2013.01); *H02K 1/28* (2013.01)
(58) Field of Classification Search
　　CPC ........... H02K 15/03; H02K 1/276; H02K 1/28
　　See application file for complete search history.

(56) References Cited

U.S. PATENT DOCUMENTS

| | | | |
|---|---|---|---|
| 2012/0146336 A1 | 6/2012 | Hori et al. | |
| 2016/0261158 A1* | 9/2016 | Horii ........................ | H02K 1/32 |
| 2022/0216755 A1* | 7/2022 | Matsumoto .......... | H02K 1/2766 |

FOREIGN PATENT DOCUMENTS

| | | |
|---|---|---|
| JP | 2004-129369 A | 4/2004 |
| JP | 2005-184968 A | 7/2005 |
| JP | 2009-213291 A | 9/2009 |
| JP | 2011-004529 A | 1/2011 |
| JP | 2012-125034 A | 6/2012 |

* cited by examiner

*Primary Examiner* — Thomas Truong
(74) *Attorney, Agent, or Firm* — Oliff PLC

(57)　　　　　　ABSTRACT

A method for manufacturing a rotor capable of efficiently cooling down a magnet inserted into a magnet insertion hole of a rotor core is provided. The method for manufacturing the rotor includes: fixing a first end plate in which a slit is formed to one end part of the rotor core in an axial direction and causing a magnet insertion hole of the rotor core and the slit of the first end plate to be continuous; fixing a second end plate to another end part of the rotor core in the axial direction; and holding the magnet inserted into the magnet insertion hole of the rotor core by a convex part that is formed in a position of the first end plate overlapping the magnet in the axial direction of the rotor core and the second end plate and fixing the magnet therein.

5 Claims, 16 Drawing Sheets

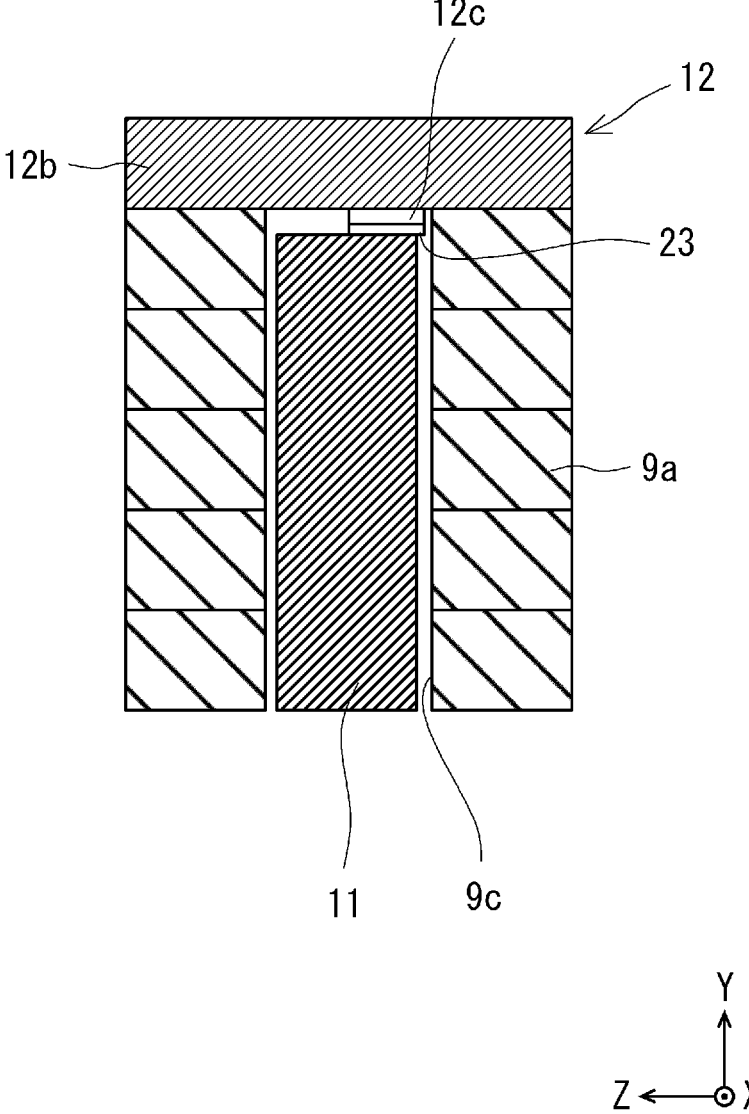
F i g.  16

METHOD FOR MANUFACTURING ROTOR, ROTOR, DRIVE APPARATUS, AND END PLATE

CROSS REFERENCE TO RELATED APPLICATIONS

This application is based upon and claims the benefit of priority from Japanese patent application No. 2022-181611, filed on Nov. 14, 2022, the disclosure of which is incorporated herein in its entirety by reference.

BACKGROUND

The present disclosure relates to a method for manufacturing a rotor, a rotor, a drive apparatus, and an end plate.

For example, a rotor has a configuration in which a rotor core is held by an end plate in order to fix a plurality of electromagnetic steel sheets that form the rotor core. For example, in Japanese Unexamined Patent Application Publication No. 2012-125034, an end plate is provided so as to hold a rotor core, a magnet is inserted into a magnet insertion hole of the rotor core via a magnet insertion hole formed in one end plate, and then the magnet insertion hole provided in the end plate is filled up with a non-magnetic material such as resin. This rotor is thus manufactured.

SUMMARY

The applicants have found the following problem. A general rotor is configured in such a way that a magnet is fixed to a rotor core by resin injected into a magnet insertion hole of the rotor core. Therefore, there is a problem that the magnet inserted into the magnet insertion hole of the rotor core is surrounded by resin and therefore the magnet cannot be efficiently cooled down.

The present disclosure has been made in view of the above problem, and provides a method for manufacturing a rotor, a rotor, a drive apparatus, and an end plate capable of efficiently cooling down a magnet inserted into a magnet insertion hole of a rotor core.

A method for manufacturing a rotor according to one aspect of the present disclosure is a method for manufacturing a rotor in which a rotor core including electromagnetic steel sheets laminated to each other is held by a first end plate and a second end plate, the method including: fixing the first end plate in which a slit is formed to one end part of the rotor core in an axial direction and causing a magnet insertion hole of the rotor core and the slit of the first end plate to be continuous; fixing the second end plate to another end part of the rotor core in the axial direction; and holding the magnet inserted into the magnet insertion hole of the rotor core by a convex part that is formed in a position of the first end plate overlapping the magnet in the axial direction of the rotor core and the second end plate and fixing the magnet therein.

The aforementioned method for manufacturing the rotor may include: bending, when the magnet is inserted into the magnet insertion hole of the rotor core, a cover part that is disposed inside the slit having a C shape in the first end plate and forming a magnet insertion hole in the first end plate, and causing the magnet insertion hole of the rotor core to be exposed and inserting the magnet into the magnet insertion hole of the rotor core via the magnet insertion hole of the first end plate; and bending back, when the magnet is fixed, the cover part of the first end plate so as to cover the magnet insertion hole of the rotor with the cover part, thereby causing the convex part formed in the cover part of the first end plate to contact the magnet.

In the aforementioned method for manufacturing the rotor, the cover part of the first end plate may be bent or bent back by a preset bend line, and the convex part may be formed so as to cross over the bend line.

The aforementioned method for manufacturing the rotor may include fixing the first end plate in which the convex part is formed in advance to one end part of the rotor core in the axial direction.

The aforementioned method for manufacturing the rotor may include: measuring a value of a measurement parameter that is set in advance when a voltage is applied between the first end plate and the second end plate after the magnet is fixed; and adjusting a bent-back amount of the cover part of the first end plate in such a way that the value of the measurement parameter becomes smaller than a preset threshold.

A rotor according to one aspect of the present disclosure is a rotor in which a rotor core including electromagnetic steel sheets laminated to each other is held by a first end plate and a second end plate, in which the first end plate includes: a slit that is continuous with a magnet insertion hole of the rotor core; and a convex part that is formed in a position of the first end plate overlapping a magnet inserted into the magnet insertion hole of the rotor core in an axial direction of the rotor core and is protruded toward the magnet, the magnet is held by the convex part of the first end plate and the second end plate and fixed therein, and a gap is formed between the magnet insertion part of the rotor core and the magnet.

In the aforementioned rotor, the slit may have a C shape and the convex part may be disposed so as to cross over a line that connects end parts of the slit on a side of an opening.

In the aforementioned rotor, the second end plate may include a slit that is continuous with the magnet insertion hole of the rotor core.

In the aforementioned rotor, the second end plate includes a convex part that is formed in a position of the second end plate overlapping the magnet in an axial direction of the rotor core and is protruded toward the magnet, and the magnet is held by the convex part of the first end plate and the convex part of the second end plate and fixed therein.

A drive apparatus according to one aspect of the present disclosure includes: a motor including the above rotor; a housing that houses the motor; and a cooling medium supplied to the inside of the housing.

An end plate according to one aspect of the present disclosure is an end plate that is used to hold a rotor core including electromagnetic steel sheets laminated to each other, the end plate including: a slit that is continuous with a magnet insertion hole of the rotor core in a state in which the end plate is fixed to an end part of the rotor core in an axial direction.

The aforementioned end plate may include a convex part that is formed in a position of the end plate overlapping the magnet inserted into the magnet insertion hole of the rotor core in the axial direction of the rotor core in a state in which the end plate is fixed to the end part of the rotor core in the axial direction and is protruded toward the magnet.

According to the present disclosure, it is possible to achieve a method for manufacturing a rotor, a rotor, a drive apparatus, and an end plate capable of efficiently cooling down a magnet inserted into a magnet insertion hole of a rotor core.

The above and other objects, features and advantages of the present disclosure will become more fully understood from the detailed description given hereinbelow and the accompanying drawings which are given by way of illustration only, and thus are not to be considered as limiting the present disclosure.

BRIEF DESCRIPTION OF DRAWINGS

FIG. 16 is a cross-sectional view showing a state in which the magnet is covered with the cover part of the first end plate in the rotor according to the other embodiment.

DESCRIPTION OF EMBODIMENTS

Hereinafter, with reference to the drawings, a specific embodiment to which the present disclosure is applied will be described in detail. However, the present disclosure is not limited to the following embodiment. Further, for the sake of clarification of the description, the following description will be given using a three-dimensional (XYZ) coordinate system, and the following descriptions and the drawings are simplified as appropriate.

Figure 1:
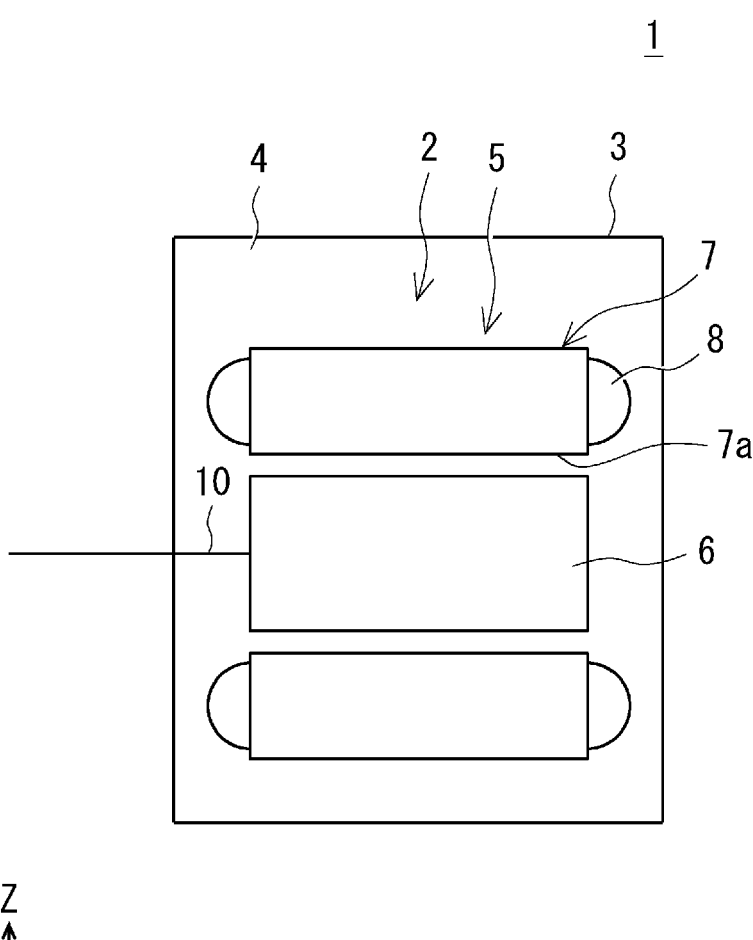
FIG. 1 is a diagram showing a configuration of a drive apparatus according to an embodiment.

First, a configuration of a drive apparatus according to this embodiment will be described. FIG. 1 is a diagram showing a configuration of a drive apparatus according to this embodiment. As shown in FIG. 1, a drive apparatus 1 according to this embodiment includes a motor 2, a housing 3, and a cooling medium 4.

As shown in FIG. 1, the motor 2 includes a stator 5 and a rotor 6. The stator 5 includes a stator core 7 in which electromagnetic steel sheets having a substantially annular shape that are substantially parallel to an XZ plane are laminated in a Y-axis direction, and a coil 8 wound onto the stator core 7.

Figure 2:
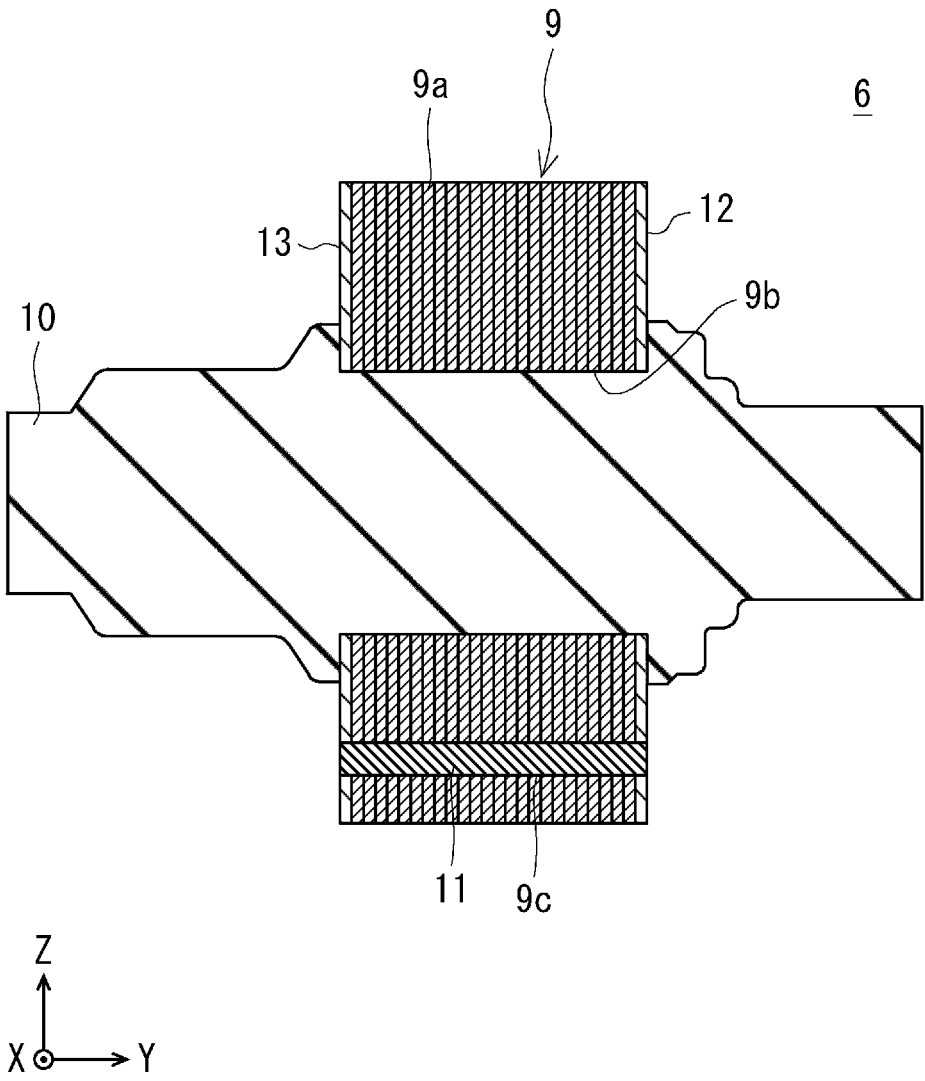
FIG. 2 is a cross-sectional view showing a rotor according to the embodiment.

FIG. 2 is a cross-sectional view showing the rotor according to this embodiment. As shown in FIG. 2, the rotor 6 includes a rotor core 9, a shaft 10, a magnet 11, a first end plate 12, and a second end plate 13. As shown in FIG. 1, the rotor 6 is inserted into a through-hole 7a formed in the stator core 7 of the stator 5.

As shown in FIG. 2, the rotor core 9 is formed of electromagnetic steel sheets 9a that are laminated in the Y-axis direction, the electromagnetic steel sheets 9a having a substantially annular shape that are substantially parallel to the XZ plane. The rotor core 9 includes a through-hole 9b penetrating substantially the center of the rotor core 9 in the Y-axis direction, and magnet insertion holes 9c that are disposed in the circumferential direction of the rotor core 9 with gaps therebetween and penetrate the rotor core 9 in the Y-axis direction.

Figure 4:
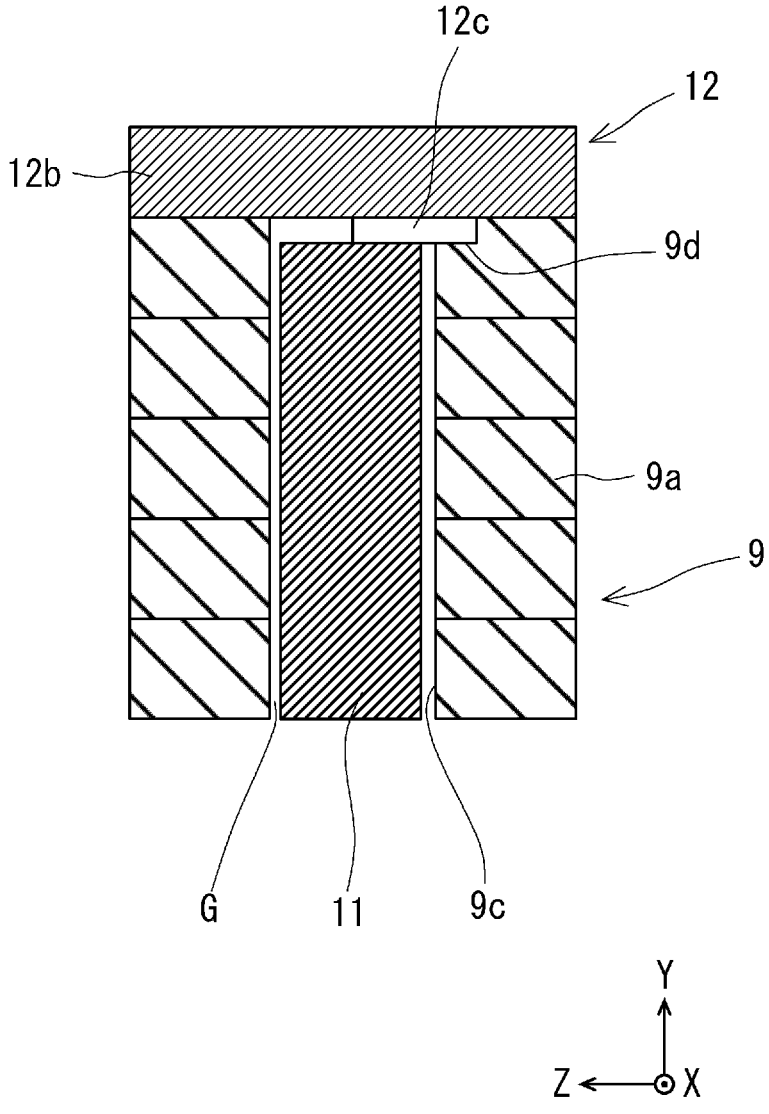
FIG. 4 is a cross-sectional view showing a state in which the magnet is covered with the cover part of the first end plate in the rotor according to the embodiment.

As shown in FIG. 2, the shaft 10 is extended in the Y-axis direction and is fixed to the rotor core 9 in a state in which the shaft 10 is inserted into the through-hole 9b of the rotor core 9. The magnet 11 is extended in the Y-axis direction and is inserted into the magnet insertion hole 9c of the rotor core 9. At this time, a gap G (see FIG. 4) is formed between the circumferential surface of the magnet 11 and the circumferential surface of the magnet insertion hole 9c of the rotor core 9. In FIG. 4 and so on, the gap G is exaggerated.

As shown in FIG. 2, for example, the first end plate 12 is fixed to an end part of the rotor core 9 on the positive Y-axis side by means such as welding. However, the means for fixing the first end plate 12 to the end part of the rotor core 9 on the positive Y-axis side is not particularly limited. For example, the first end plate 12 may be fixed to the end part of the rotor core 9 on the positive Y-axis side by a claw or the like formed in the first end plate 12.

Figure 3:
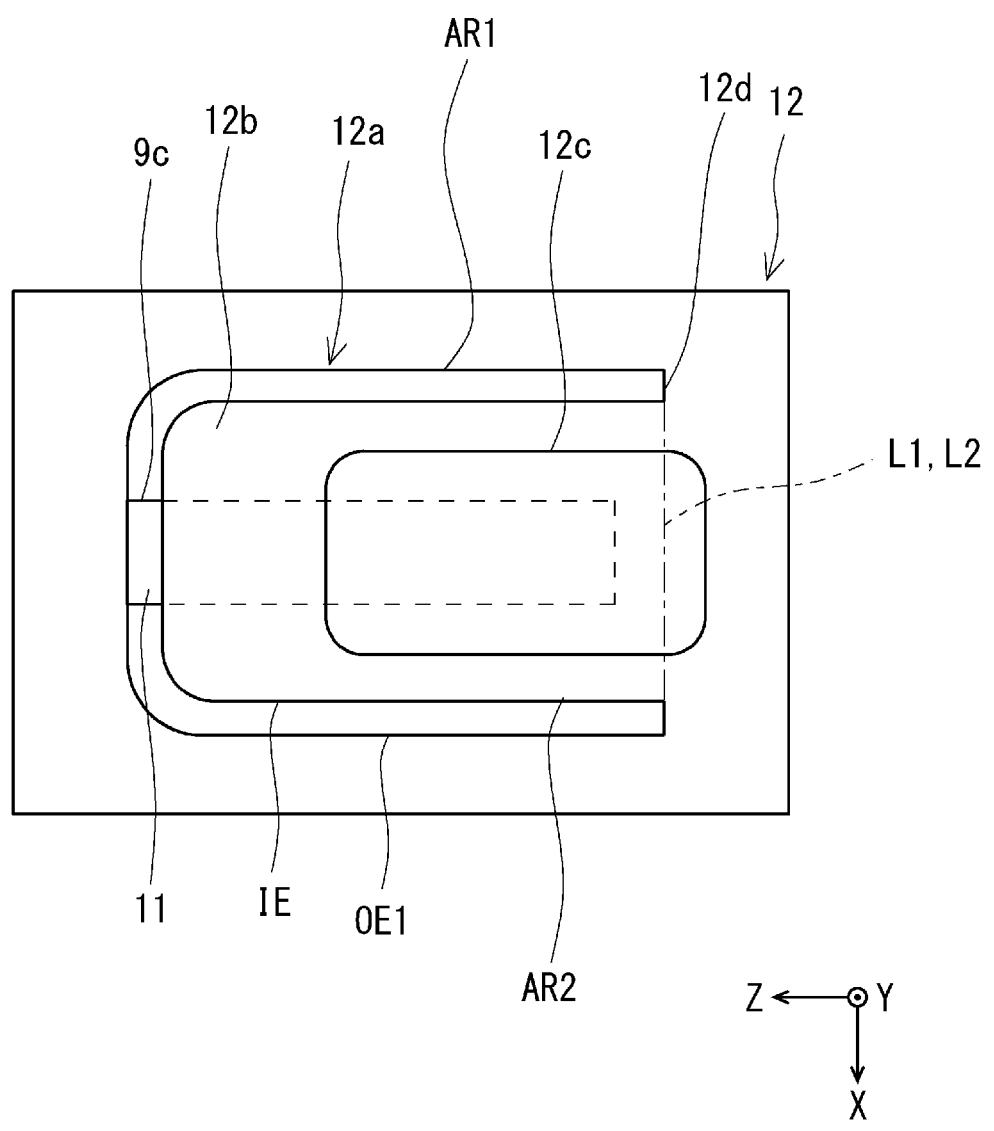
FIG. 3 is a diagram showing a state in which a magnet is covered with a cover part of a first end plate in the rotor according to the embodiment when seen from the positive Y-axis side.
Figure 5:
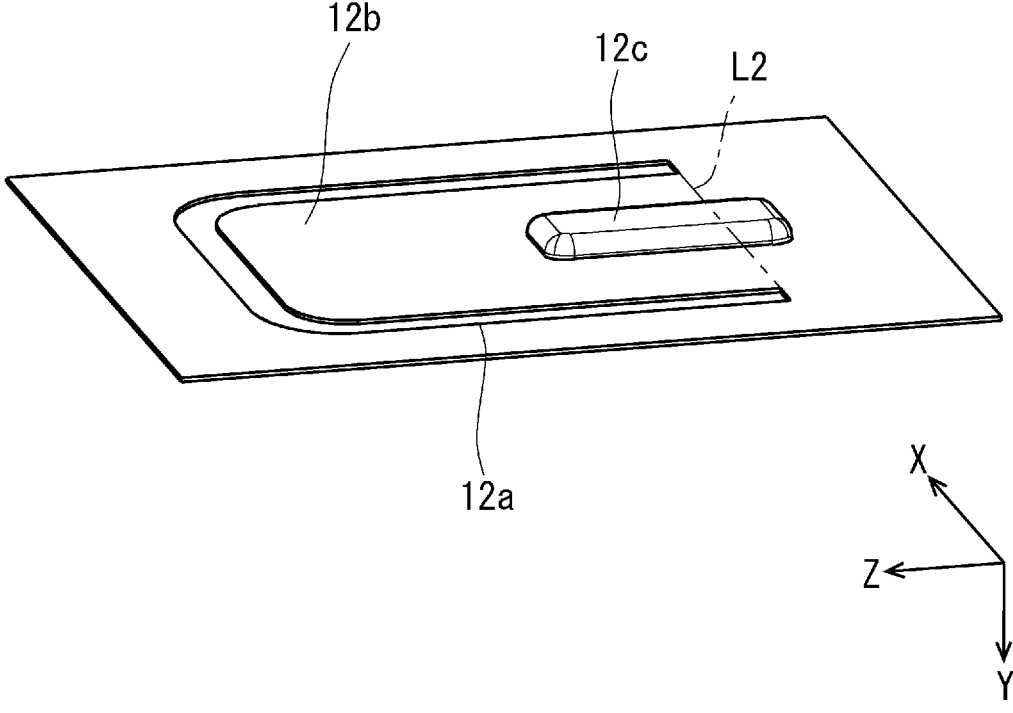
FIG. 5 is a diagram showing a convex part of the first end plate.

The first end plate 12, which is formed of, for example, an electromagnetic steel sheet, has, as a basic form, a substantially annular shape when seen from a Z-axis direction. FIG. 3 is a diagram showing a state in which the magnet is covered with a cover part of the first end plate in the rotor according to this embodiment when seen from the positive Y-axis side. FIG. 4 is a cross-sectional view showing a state in which the magnet is covered with the cover part of the first end plate in the rotor according to this embodiment. FIG. 5 is a diagram showing a convex part of the first end plate.

As shown in FIGS. 3 and 4, the first end plate 12 includes a slit 12a, a cover part 12b, and a convex part 12c. As shown in FIG. 3, the slit 12a is provided so as to surround the magnet insertion hole 9c of the rotor core 9 except for a part of the magnet insertion hole 9c of the rotor core 9 (e.g., radially outer end of the rotor core 9 in the magnet insertion hole 9c), and has, for example, a substantially C shape when seen from the Y-axis direction.

As shown in FIG. 3, the whole area of the magnet insertion hole 9c of the rotor core 9 is disposed in a first area AR1 surrounded by an outer edge OE1 of the slit 12a and a line L1 that connects end parts 12d of the slit 12a on a side of an opening when seen from the Y-axis direction. Therefore, the end parts 12d of the slit 12a on the side of the opening are disposed on the radially outer side of the rotor core 9 with respect to the radially outer end of the rotor core 9 in the magnet insertion hole 9c of the rotor core 9.

The C shape is not limited to a rectangular shape, and may include a curved shape or a polygonal shape. In summary, the C shape allows the whole area of the magnet insertion hole 9c of the rotor core 9 to be disposed in the first area AR1 of the slit 12a when seen from the Y-axis direction. At this time, as shown in FIG. 3, the magnet insertion hole 9c of the rotor core 9 and the slit 12a of the first end plate 12 may partially overlap each other when seen from the Y-axis direction.

As shown in FIG. 3, the cover part 12b is formed in an inner area of the slit 12a. That is, the cover part 12b forms a second area AR2 surrounded by an inner periphery IE of the slit 12a and the line L1 that connects the end parts 12d of the slit 12a on the side of the opening. The cover part 12b, which has, for example, a substantially rectangular shape when seen from the Y-axis direction, covers at least a part of the magnet 11.

The cover part 12b can be bent and bent back by a bending line L2 in such a way that the whole end of the magnet insertion hole 9c of the rotor core 9 on the positive Y-axis side can be exposed. The bending line L2 may be arranged on the line L1 that connects the end parts 12d of the slit 12a on the side of the opening, as shown in, for example, FIG. 3.

However, it is sufficient that the bending line L2 be arranged in such a way that the whole end of the magnet insertion hole 9c of the rotor core 9 on the positive Y-axis side can be exposed when the cover part 12b is bent. Note that the bending line L2 may be arranged, for example, on the surface of the first end plate 12 on the negative Y-axis side.

As shown in FIGS. 4 and 5, the convex part 12c is protruded toward the negative Y-axis from the cover part 12b. The end part of the convex part 12c on the negative Y-axis side touches the end part of the magnet 11 on the positive Y-axis side. The convex part 12c may be formed, for example, by pressing a part of the first end plate 12 toward the negative Y-axis side. However, the convex part 12c may be formed of a material other than that of the first end plate 12 and fixed to the end part of the first end plate 12 on the negative Y-axis side.

As shown in FIGS. 3 and 5, the convex part 12c may be disposed so as to cross over the bending line L2. Accordingly, springback when the cover part 12b is bent back may be reduced. At this time, as shown in FIG. 4, when the convex part 12c interferes with the rotor core 9, a concave part 9d that allows the convex part 12c to escape may be formed in the rotor core 9.

As shown in FIG. 2, for example, the second end plate 13 is fixed to the end part of the rotor core 9 on the negative Y-axis side by means such as welding, and the magnet 11 is held between the convex part 12c of the first end plate 12 and the second end plate 13 and fixed therein.

Note that the means for fixing the second end plate 13 to the end part of the rotor core 9 on the negative Y-axis side is not limited, and the second end plate 13 may be fixed to the end part of the rotor core 9 on the negative Y-axis side by, for example, a claw or the like formed in the second end plate 13.

The second end plate 13 may be formed of, for example, an electromagnetic steel sheet, and has, as a basic form, a substantially annular shape when seen from the Z-axis direction. The second end plate 13 may have a configuration substantially the same as that of the first end plate 12.

Figure 6:
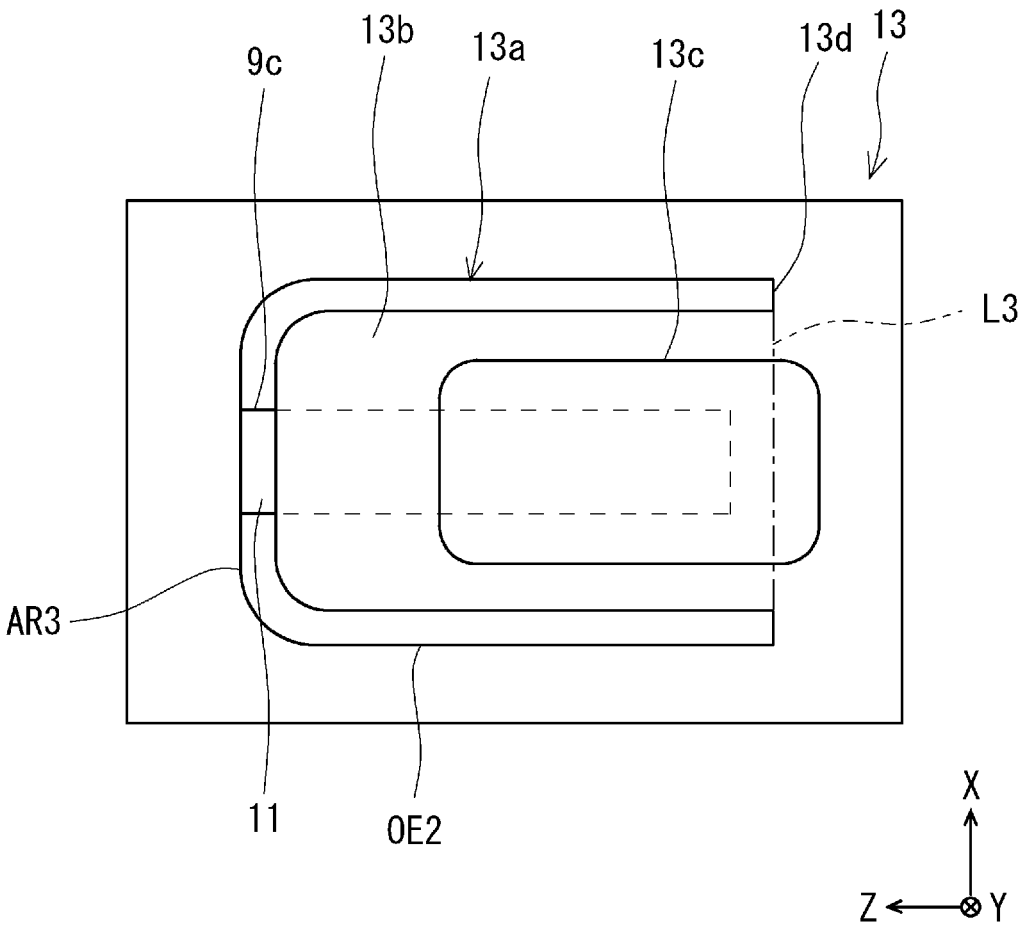
FIG. 6 is a diagram showing a state in which the magnet is covered with a cover part of a second end plate in the rotor according to the embodiment when seen from the negative Y-axis side.
Figure 7:
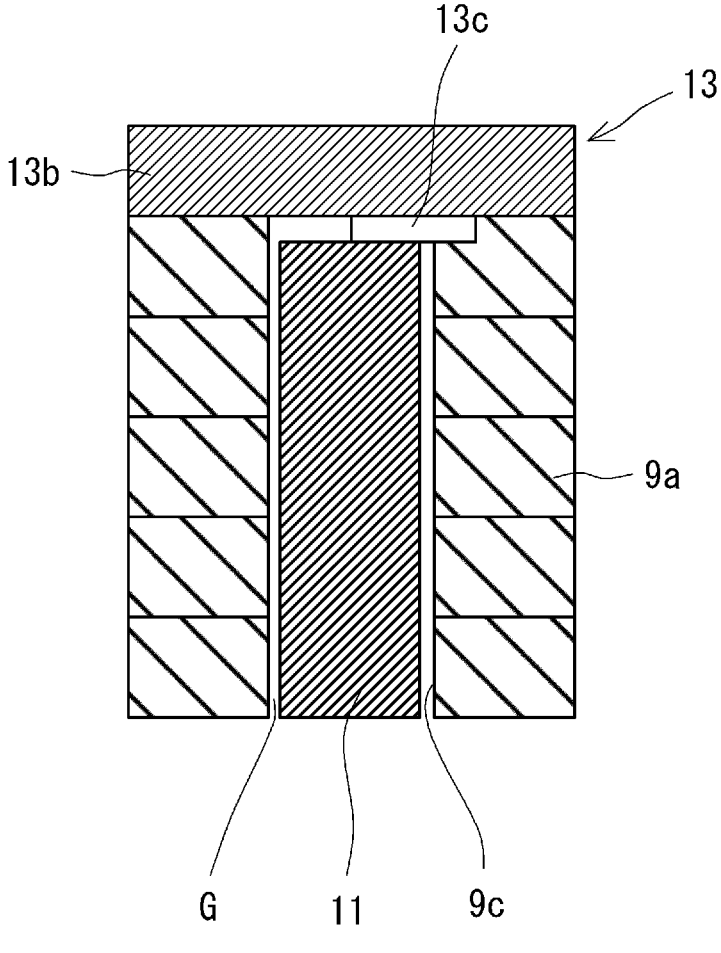
FIG. 7 is a cross-sectional view showing a state in which the magnet is covered with the cover part of the second end plate in the rotor according to the embodiment.

FIG. 6 is a diagram showing a state in which the magnet is covered with the cover part of the second end plate in the rotor according to this embodiment when seen from the negative Y-axis side. FIG. 7 is a cross-sectional view showing a state in which the magnet is covered with the cover part of the second end plate in the rotor according to this embodiment.

That is, while the detailed descriptions will be omitted, as shown in FIGS. 6 and 7, the second end plate 13 includes a slit 13a that is arranged so as to surround the magnet insertion hole 9c of the rotor core 9 except for a part of the magnet insertion hole 9c of the rotor core 9, a cover part 13b that forms an inner area of the slit 13a and covers at least a part of the magnet 11, and a convex part 13c that is protruded toward the positive Y-axis from the cover part 13b and contacts the end part of the magnet 11 on the negative Y-axis side.

Accordingly, the magnet 11 may be held by the convex part 12c of the first end plate 12 and the convex part 13c of the second end plate 13 and fixed therein. Further, it is possible to communicate the slit 12a of the first end plate 12, the gap G between the magnet insertion hole 9c of the rotor core 9 and the magnet 11, and the slit 13a of the second end plate 13 with one another.

As shown in FIG. 1, the housing 3 houses the motor 2. For example, the inside of the housing 3 is substantially sealed in a state in which the shaft 10 of the rotor 6 is made to pass through the end part of the housing 3 on the negative Y-axis side. However, it is sufficient that the housing 3 house at least the rotor 6 of the motor 2, or may house anther drive transmission mechanism such as a clutch or a gear.

As shown in FIG. 1, the cooling medium 4 is housed inside the housing 3. The cooling medium 4 may be, for example, liquid such as oil used as a cooling medium. The cooling medium 4 enters the gap G between the magnet insertion hole 9c of the rotor core 9 and the magnet 11 via the slit 12a of the first end plate 12 or the slit 13a of the second end plate 13.

That is, the cooling medium 4 directly contacts the magnet 11. Accordingly, the magnet 11 can be efficiently cooled down by the cooling medium 4. Note that the cooling medium 4 may be circulated inside the housing 3 by a pump (not shown). Further, the cooling medium 4 may be any medium that can enter the gap G between the magnet insertion hole 9c of the rotor core 9 and the magnet 11, and may be, for example, gas.

Figure 8:
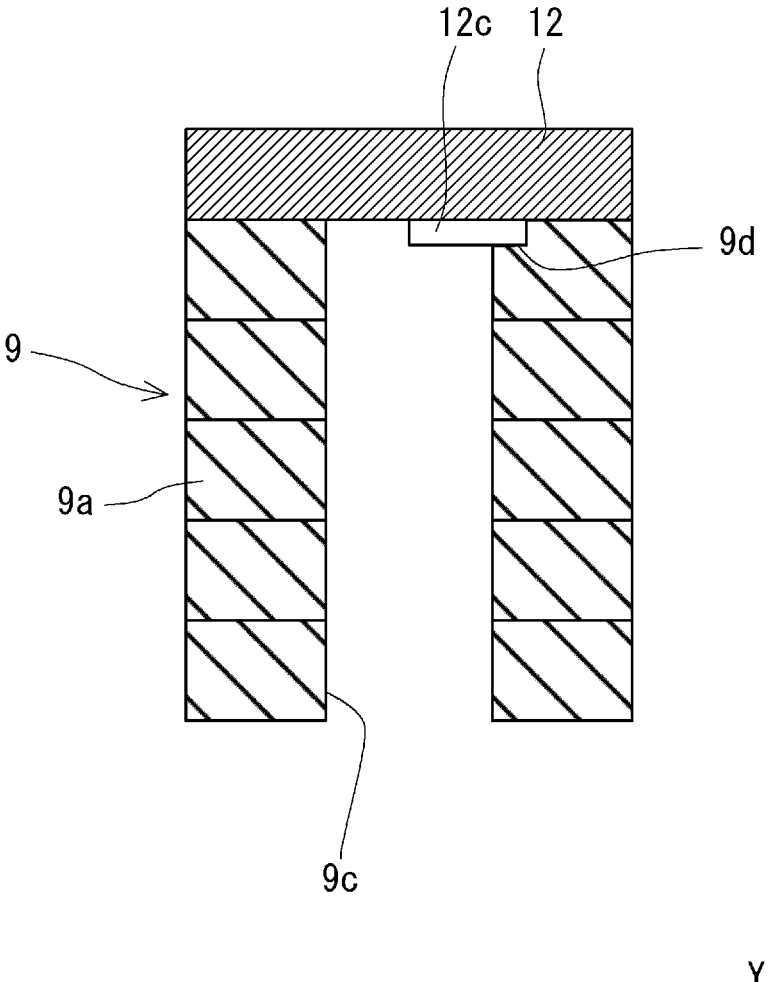
FIG. 8 is a cross-sectional view showing a state in which the first end plate is fixed to a rotor core.
Figure 9:
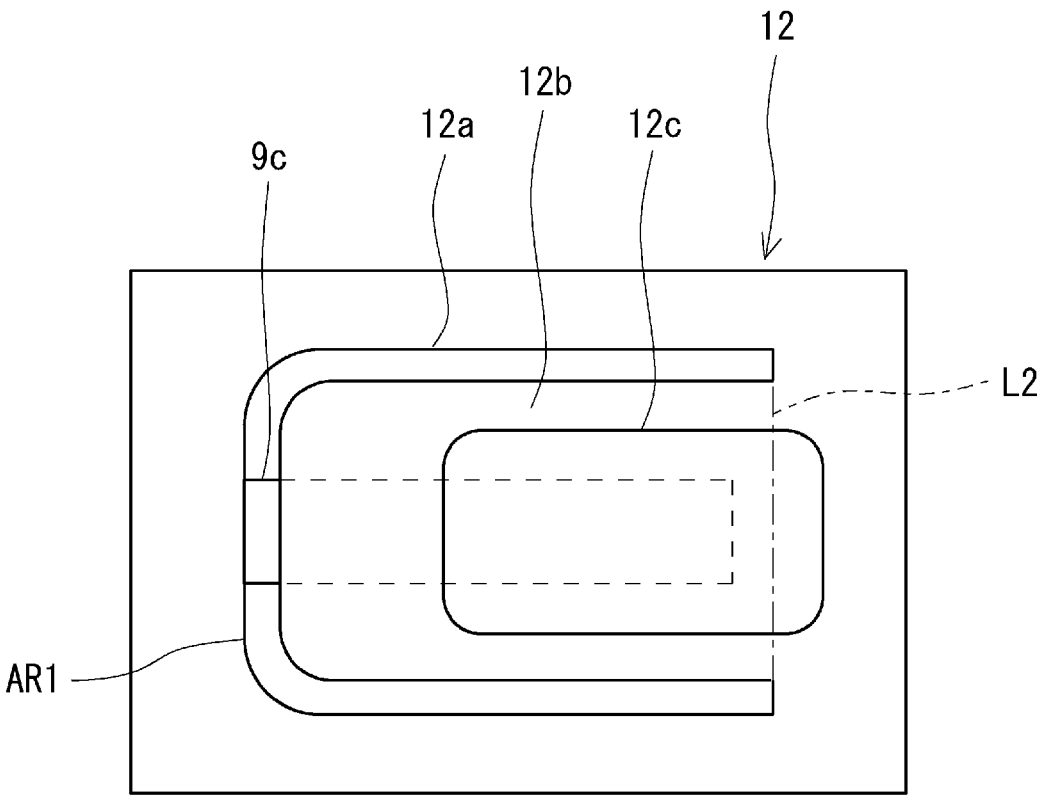
FIG. 9 is a diagram showing a state in which the first end plate is fixed to the rotor core when seen from the positive Y-axis side.
Figure 9:
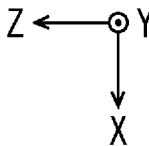
Figure 10:
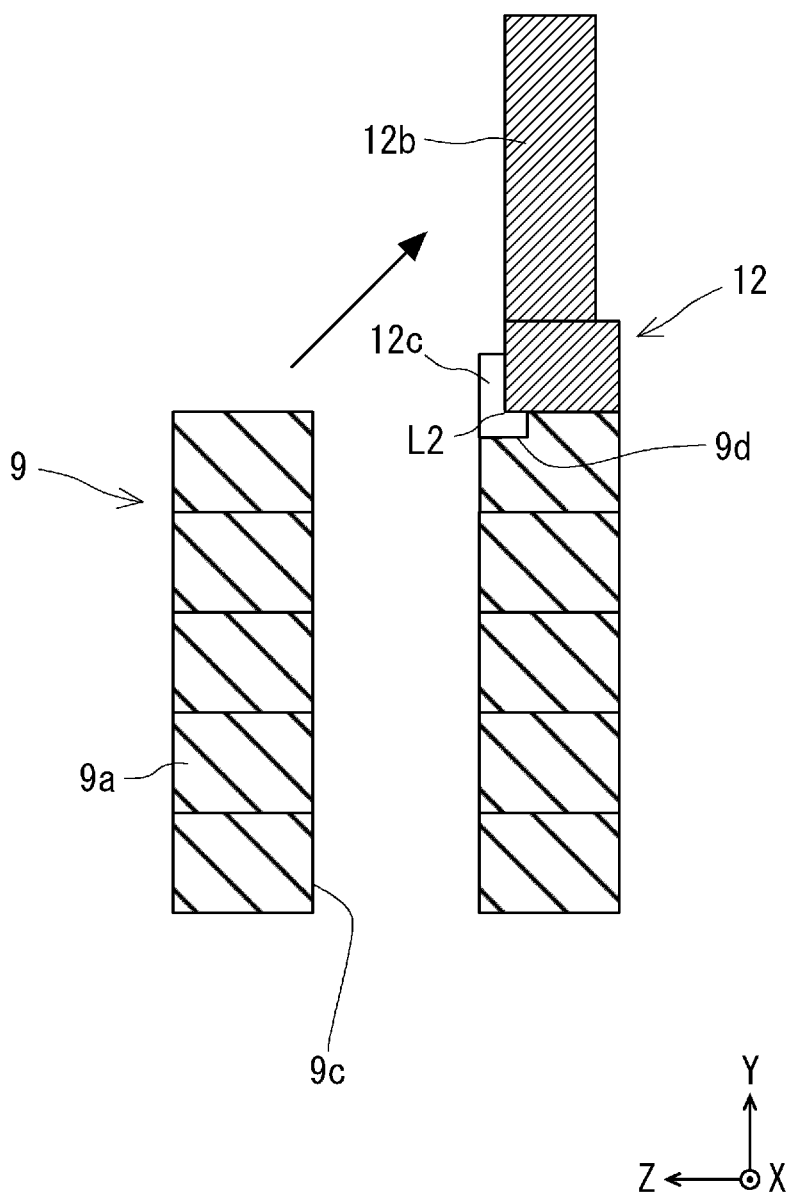
FIG. 10 is a cross-sectional view showing a state in which the cover part of the first end plate is bent.
Figure 11:
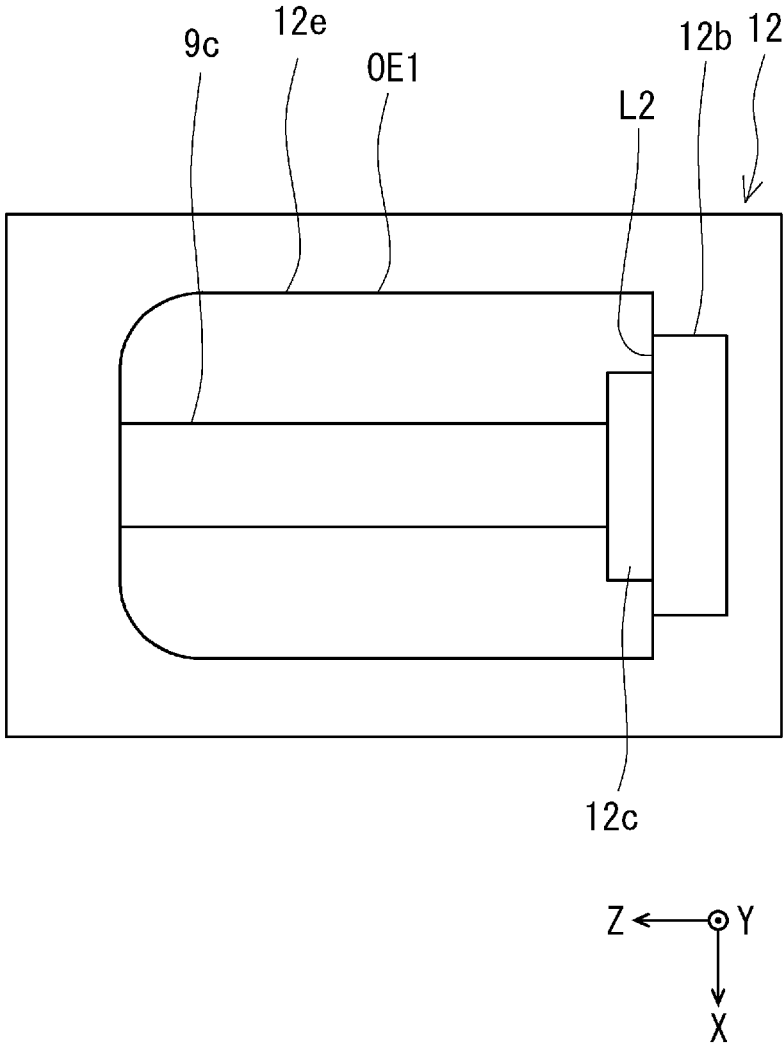
FIG. 11 is a diagram showing a state in which the cover part of the first end plate is bent when seen from the positive Y-axis side.
Figure 12:
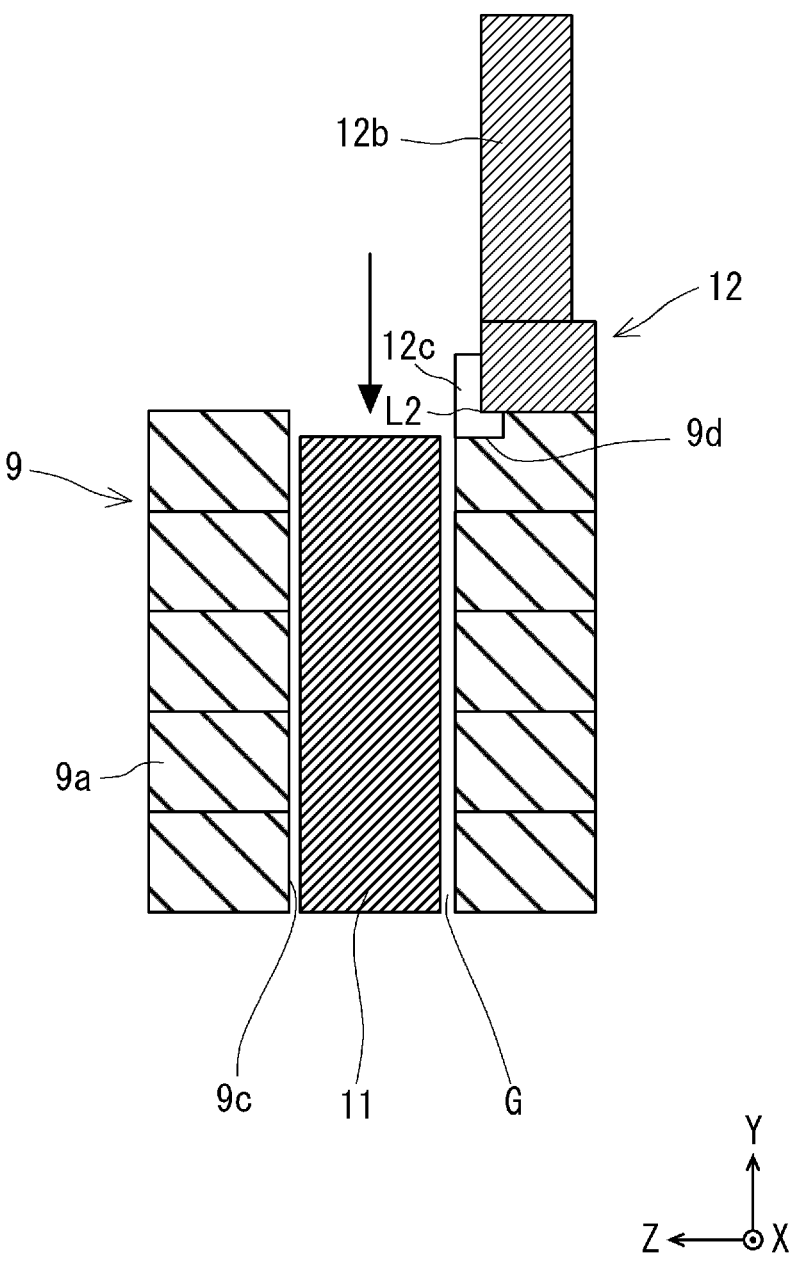
FIG. 12 is a cross-sectional view showing a state in which the magnet is inserted into a magnet insertion hole of the rotor core.
Figure 13:
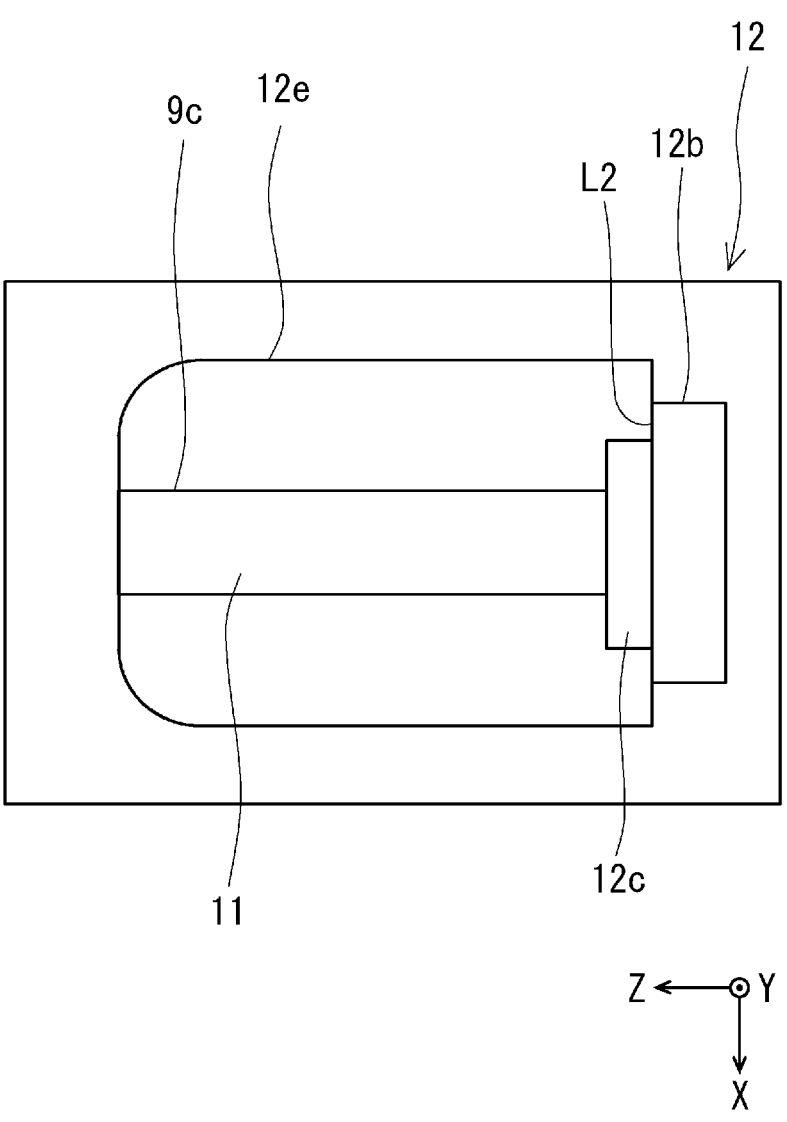
FIG. 13 is a diagram showing a state in which the magnet is inserted into the magnet insertion hole of the rotor core when seen from the positive Y-axis side.

Next, a method for manufacturing a rotor according to this embodiment will be described. FIG. 8 is a cross-sectional view showing a state in which the first end plate is fixed to the rotor core. FIG. 9 is a diagram showing a state in which the first end plate is fixed to the rotor core when seen from the positive Y-axis side. FIG. 10 is a cross-sectional view showing a state in which the cover part of the first end plate is bent. FIG. 11 shows a state in which the cover part of the first end plate is bent when seen from the positive Y-axis side. FIG. 12 is a cross-sectional view showing a state in which the magnet is inserted into the magnet insertion hole of the rotor core. FIG. 13 is a diagram showing a state in which the magnet is inserted into the magnet insertion hole of the rotor core when seen from the positive Y-axis side.

It is assumed that the slit 12a, the cover part 12b, and the convex part 12c are formed in the first end plate 12 in advance and the slit 13a, the cover part 13b, and the convex part 13c are formed in the second end plate 13 in advance.

First, the electromagnetic steel sheets 9*a* are laminated to form the rotor core 9. Then, as shown in FIG. 8, the first end plate 12 is fixed to the end part of the rotor core 9 on the positive Y-axis side and the second end plate 13 is fixed to the end part of the rotor core 9 on the negative Y-axis side.

Accordingly, as shown in FIG. 9, the whole area of the magnet insertion hole 9*c* of the rotor core 9 is disposed in the first area AR1 when seen from the Y-axis direction. Further, as shown in FIG. 6, the whole area of the magnet insertion hole 9*c* of the rotor core 9 is disposed in a third area AR3 surrounded by an outer edge OE2 of the slit 13*a* of the second end plate 13 and a line L3 that connects end parts 13*d* of the slit 13*a* on the side of the opening.

At this time, when seen from the Y-axis direction, the magnet insertion hole 9*c* of the rotor core 9, the slit 12*a* of the first end plate 12, and the slit 13*a* of the second end plate 13 may partially overlap one another.

Next, as shown in FIG. 10, the cover part 12*b* and the convex part 12*c* are bent by the bending line L2 of the first end plate 12 in the positive Y-axis side. Accordingly, as shown in FIG. 11, the magnet insertion hole 12*e* is formed in an area surrounded by the outer edge OE1 of the slit 12*a* of the first end plate 12 and the bending line L2.

At this time, as shown in FIGS. 10 and 11, the whole area of the magnet insertion hole 9*c* of the rotor core 9 is disposed in the magnet insertion hole 12*e* of the first end plate 12 when seen from the Y-axis direction. That is, when the convex part 12*c* is bent by the bending line L2, the convex part 12*c* does not interfere with the magnet insertion hole 9*c* of the rotor core 9 when seen from the Y-axis direction.

Next, as shown in FIGS. 12 and 13, the magnet 11 is inserted into the magnet insertion hole 9*c* of the rotor core 9 via the magnet insertion hole 12*e* of the first end plate 12. At this time, a gap G is formed between the circumferential surface of the magnet insertion hole 9*c* of the rotor core 9 and the circumferential surface of the magnet 11. Further, as shown in FIG. 7, the end part of the magnet 11 on the negative Y-axis side contacts the convex part 13*c* of the second end plate 13.

Next, as shown in FIGS. 3 and 4, the cover part 12*b* and the convex part 12*c* are bent back toward the negative Y-axis side by the bending line L2 of the first end plate 12 to make the convex part 12*c* of the first end plate 12 contact the end part of the magnet 11 on the negative Y-axis side. Accordingly, it is possible to hold the magnet 11 by the convex part 12*c* of the first end plate 12 and the convex part 13*c* of the second end plate 13 and fix the magnet 11 therein.

At this time, when the convex part 12*c* is disposed so as to cross over the bending line L2, springback when the cover part 12*b* is bent back may be reduced. Therefore, it is possible to maintain a state in which the magnet 11 is fixed by the convex part 12*c* of the first end plate 12 and the convex part 13*c* of the second end plate 13 well.

After that, for example, by making the shaft 10 pass through the through-hole 9*b* of the rotor core 9 and fixing the shaft 10 thereto, the rotor 6 may be manufactured. When a current flows between the first end plate 12 and the second end plate 13 in the rotor 6, an eddy current occurs in the Y-axis direction and eddy loss occurs in the motor 2.

Figure 14:
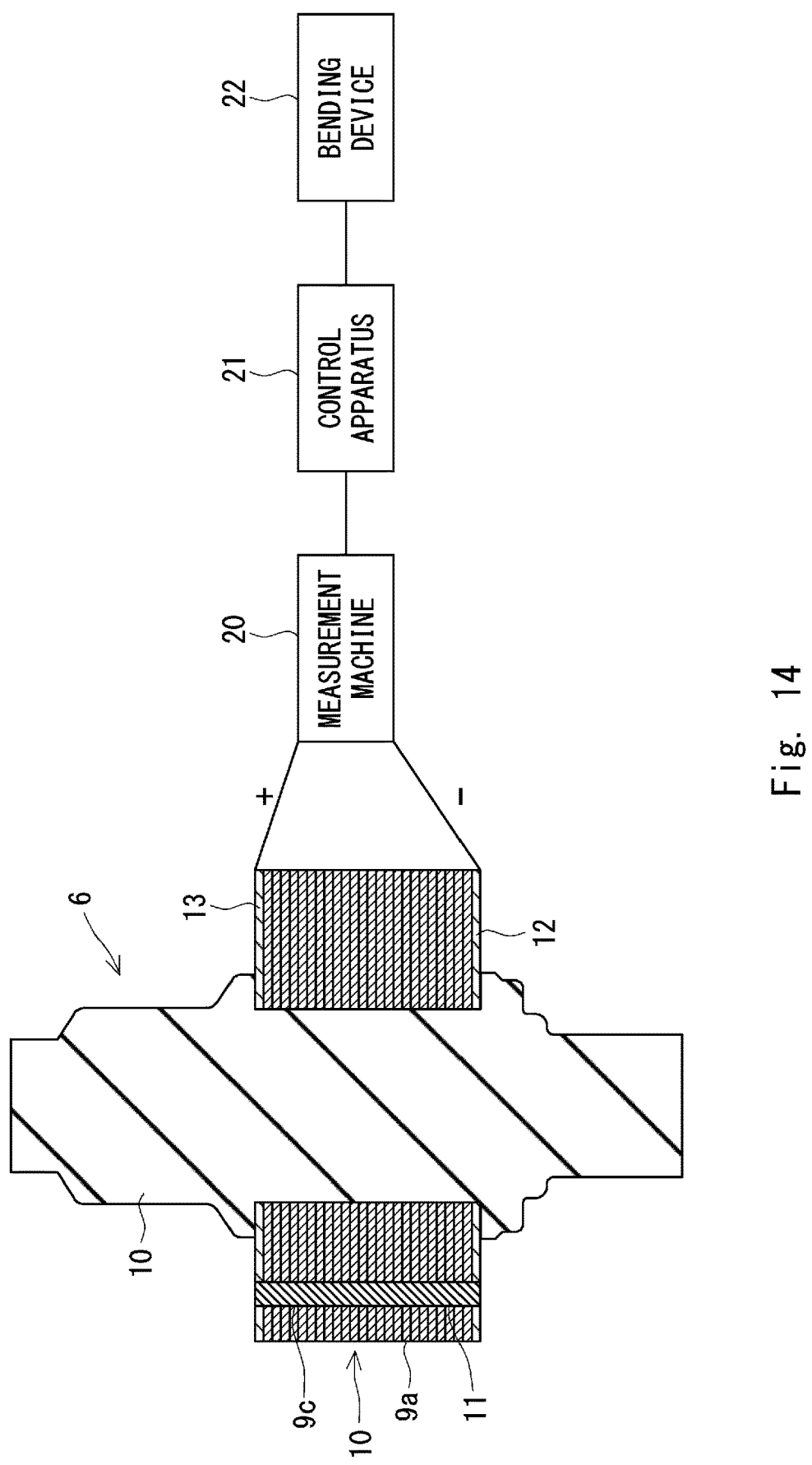
FIG. 14 is a diagram showing a configuration of a control system for adjusting a bent-back amount of the cover part of the first end plate.

In order to solve the above problem, for example, after the rotor 6 is manufactured, a voltage may be applied between the first end plate 12 and the second end plate 13 and a bent-back amount of the cover part 12*b* of the first end plate 12 may be adjusted in such a way that the measured current value becomes smaller than a preset threshold. FIG. 14 is a diagram showing a configuration of a control system for adjusting the bent-back amount of the cover part 12*b* of the first end plate 12.

For example, as shown in FIG. 14, a voltage is applied between the first end plate 12 and the second end plate 13 of the manufactured rotor 6 this time using a measurement machine 20 to measure a value of a current that flows between the first end plate 12 and the second end plate 13. Then, next time, a control apparatus 21 may control a bending device 22 that bends the cover part 12*b* of the first end plate 12 in such a way that the value of the current that flows between the first end plate 12 and the second end plate 13 of the manufactured rotor 6 becomes smaller than a preset threshold.

Accordingly, the amount of the convex part 12*c* of the first end plate 12 contacting the magnet 11 can be adjusted and a value of the current that flows between the first end plate 12 and the second end plate 13 can be reduced to a value that is equal to or smaller than a preset threshold. As a result, eddy loss of the motor 2 may be reduced.

Note that the bending device 22 may have, for example, a configuration in which the cover part 12*b* of the first end plate 12 is bent by a pin or the like. Note that the measurement parameter is not limited to the current value. The measurement parameter may be a value of a voltage between the first end plate 12 and the second end plate 13 or may be a temperature near the cover part 12*b*.

Note that the temperature near the cover part 12*b* may be measured in a non-contact manner. Further, the timing when the measurement parameter is measured is not limited to a timing after the rotor 6 is formed and may be any timing after the magnet 11 is fixed by the first end plate 12 and the second end plate 13.

In a general rotor, in order to fix the magnet, a high-temperature resin is injected between the magnet and the magnet insertion hole of the rotor core at a high pressure. It is therefore necessary that the general rotor have a configuration in which the electromagnetic steel sheets and the magnet can withstand both the high temperature of the high-temperature resin and the high pressure at which it is injected. In addition, the general rotor has problems regarding its quality, such as a problem that the electromagnetic steel sheets start floating when the resin is injected at a high pressure.

On the other hand, the method for manufacturing the rotor 6, the rotor 6, the drive apparatus 1, and the first end plate 12 according to this embodiment have a configuration in which the magnet 11 is fixed using the convex part 12*c* of the first end plate 12.

That is, the magnet 11 is fixed without using resin. Therefore, it is not necessary for the electromagnetic steel sheets 9*a* and the magnet 11 to have a configuration that can withstand both the high temperature of the high-temperature resin and the high pressure at which it is injected, and special characteristics of the electromagnetic steel sheets 9*a* and the magnet 11 to form the rotor 6 can be reduced. In addition, the above problems regarding the quality of the general rotor, such as the problem of the electromagnetic steel sheets 9*a* starting to float, may be prevented.

Then, when, in addition to the above, the convex part 13*c* is formed in the second end plate 13, the magnet 11 can be firmly fixed by the convex part 12*c* of the first end plate 12 and the convex part 13*c* of the second end plate 13.

Further, the method for manufacturing the rotor 6, the rotor 6, the drive apparatus 1, and the first end plate 12 according to this embodiment enable the slit 12*a* of the first end plate 12 and the gap G between the magnet insertion hole 9c of the rotor core 9 and the magnet 11 to be made continuous.

Therefore, as the cooling medium 4 may be made to enter the gap G between the magnet insertion hole 9c of the rotor core 9 and the magnet 11 so that the magnet 11 can be cooled down directly by the cooling medium 4, it is possible to cool down the magnet 11 more efficiently than the general rotor 6 does. Accordingly, heat demagnetization of the magnet 11 may be reduced. In particular, when the slit 13a is formed in the second end plate 13 as well, the magnet 11 may be efficiently cooled down.

The present disclosure is not limited to the above embodiment and may be changed as appropriate without departing from the spirit of the present disclosure.

Figure 15:
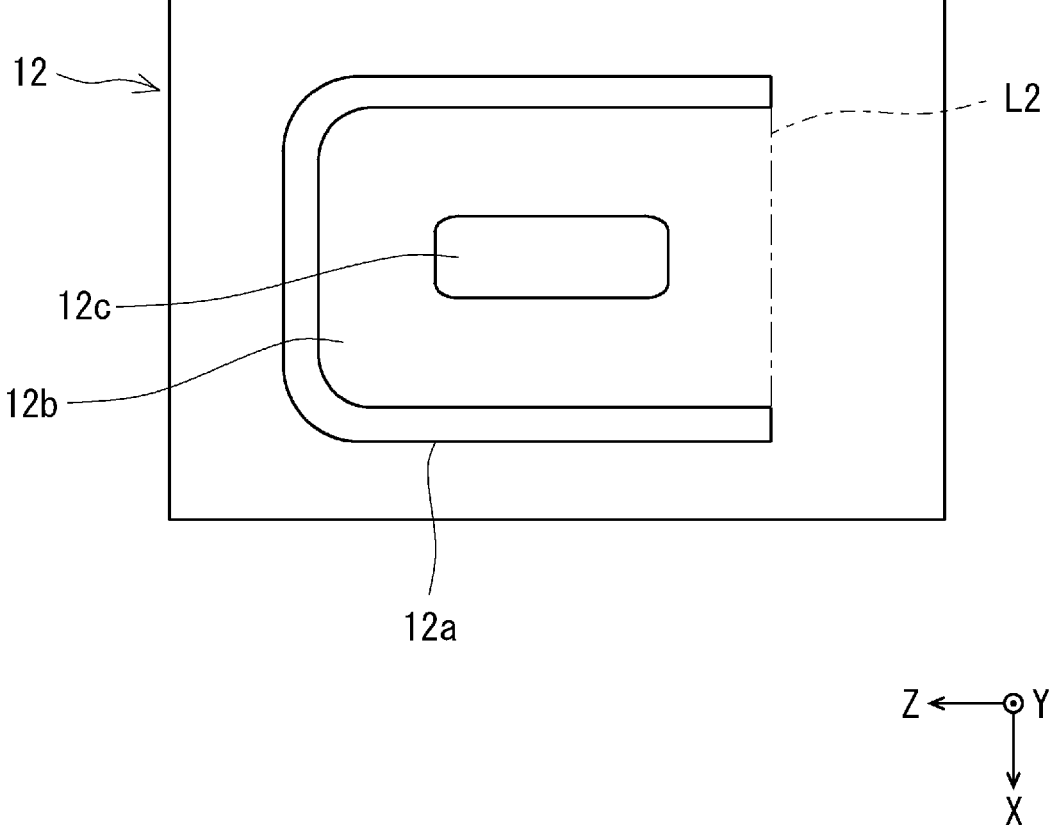
FIG. 15 is a diagram showing a state in which a magnet is covered with a cover part of a first end plate in a rotor according to another embodiment when seen from the positive Y-axis side.

For example, while the convex part 12c of the first end plate 12 according to the above embodiment is disposed so as to cross over the bending line L2, the convex part 12c of the first end plate 12 may be disposed so as not to cross over the bending line L2, as shown in FIG. 15. In summary, it is sufficient that the convex part 12c be disposed in a position where the convex part 12c can contact the magnet 11.

Further, the shape of the convex part 12c is not limited to a substantially rectangular shape, and may be a polygonal shape, an elliptical shape, a circular shape or the like when seen from the Y-axis direction. Further, the number of convex parts 12c is not limited to one and may be plural. The same goes for the convex part 13c of the second end plate 13.

For example, as shown in FIG. 16, an insulation member 23 may be disposed between the convex part 12c of the first end plate 12 and the magnet 11. The same goes for a part between the convex part 13c of the second end plate 13 and the magnet 11. Accordingly, it is possible to reduce eddy loss of the motor 2.

For example, a groove may be formed along the bending line L2. Accordingly, the cover part 12b of the first end plate 12 can be easily bent. The same goes for the second end plate 13.

For example, while the magnet insertion hole 9c of the rotor core 9 and the slit 12a of the first end plate 12 partially overlap each other in the above embodiment, the magnet insertion hole 9c of the rotor core 9 may not overlap the slit 12a of the first end plate 12. For example, the slit 12a of the first end plate 12 may be continuous with the magnet insertion hole 9c of the rotor core 9 via a gap between the rotor core 9 and the first end plate 12. The same goes for a relation between the magnet insertion hole 9c of the rotor core 9 and the slit 13a of the second end plate 13.

For example, while the first end plate 12 and the second end plate 13 are fixed to the rotor core 9 before the magnet 11 is inserted into the magnet insertion hole 9c of the rotor core 9 in the above embodiment, the first end plate 12 and the second end plate 13 may be fixed to the rotor core 9 and the magnet 11 may be held by the first end plate 12 and the second end plate 13 and fixed therein after the magnet 11 is inserted into the magnet insertion hole 9c of the rotor core 9.

For example, while the convex part 12c is formed in the first end plate 12 in advance and the convex part 13c is formed in the second end plate 13 in advance in the above embodiment, the convex part 12c or the convex part 13c may be formed after the magnet 11 is inserted into the magnet insertion hole 9c of the rotor core 9.

For example, the second end plate 13 according to the above embodiment has a configuration substantially the same as that of the first end plate 12, the slit 13a and the convex part 13c may be omitted.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A rotor in which a rotor core including electromagnetic steel sheets laminated to each other is held by a first end plate and a second end plate, wherein
the first end plate comprises:
a first slit having a C shape and being continuous with a magnet insertion hole of the rotor core;
a first cover part formed in an inner area of the first slit, the first cover part being bendable and bendable back along a line connecting end parts of the first slit on a side of an opening to each other defined as a first bending line; and
a first convex part that is formed in a position of the first end plate overlapping a magnet inserted into the magnet insertion hole of the rotor core in an axial direction of the rotor core and is protruded toward the magnet,
wherein the magnet is held by the first convex part of the first end plate and the second end plate and fixed therein,
a gap is formed between the magnet insertion hole of the rotor core and the magnet,
the first convex part is disposed so as to cross over the first bending line, and
the first bending line is arranged such that, in a state where the first cover part is bent, the whole end of the magnet insertion hole of the rotor core in the axial direction of the rotor core is exposable.

2. The rotor according to claim 1, wherein the second end plate comprises a second slit having a C shape and being continuous with the magnet insertion hole of the rotor core.

3. The rotor according to claim 2, wherein
the second end plate comprises:
a second cover part formed in an inner area of the second slit, the second cover part being bendable and bendable back along a line connecting end parts of the second slit on a side of an opening to each other defined as a second bending line; and
a second convex part that is formed in a position of the second end plate overlapping the magnet in an axial direction of the rotor core and is protruded toward the magnet,
the second convex part is disposed so as to cross over the second bending line,
the second bending line is arranged in such a way that, in a state where the second cover part is bent, the whole end of the magnet insertion hole of the rotor core in the axial direction of the rotor core is exposable, and
the magnet is held by the first convex part of the first end plate and the second convex part of the second end plate and fixed therein.

4. A drive apparatus comprising:
a motor comprising the rotor according to claim 1;
a housing that houses the motor; and
a cooling medium supplied to the inside of the housing.

5. An end plate that is used to hold a rotor core including electromagnetic steel sheets laminated to each other, wherein the end plate comprises:

a slit having C shape and being continuous with a magnet insertion hole of the rotor core in a state in which the end plate is fixed to an end part of the rotor core in an axial direction;

a cover part formed in an inner area of the slit, the cover part being bendable and bendable back along a line connecting end parts of the slit on a side of an opening to each other defined as a bending line; and a convex part that is formed in a position of the end plate overlapping the magnet inserted into the magnet insertion hole of the rotor core in the axial direction of the rotor core in a state in which the end plate is fixed to the end part of the rotor core in the axial direction and is protruded toward the magnet, the convex part is disposed so as to cross over the bending line, and the bending line is arranged in such a way that, in a state where the end plate is fixed to the end part of the rotor core, and the cover part is bent, the whole end of the magnet insertion hole of the rotor core in the axial direction of the rotor core is exposable.

\* \* \* \* \*